(12) United States Patent
Ganesan et al.

(10) Patent No.: US 11,194,589 B2
(45) Date of Patent: Dec. 7, 2021

(54) INFORMATION HANDLING SYSTEM ADAPTIVE COMPONENT RESET

(71) Applicant: Dell Products L.P., Round Rock, TX (US)

(72) Inventors: Vaideeswaran Ganesan, Bangalore (IN); Suren Kumar, Vellore (IN); B. Balaji Singh, Bangalore (IN); David Keith Chalfant, Round Rock, TX (US); Swamy Kadaba Chaluvaiah, Round Rock, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 89 days.

(21) Appl. No.: 16/243,045

(22) Filed: Jan. 8, 2019

(65) Prior Publication Data

US 2020/0218545 A1 Jul. 9, 2020

(51) Int. Cl.
| | | |
|---|---|---|
| G06F 9/4401 | (2018.01) | |
| G06F 8/65 | (2018.01) | |
| G06F 8/61 | (2018.01) | |
| G06F 13/42 | (2006.01) | |
| G06F 11/14 | (2006.01) | |

(52) U.S. Cl.
CPC .............. *G06F 9/4411* (2013.01); *G06F 8/61* (2013.01); *G06F 8/65* (2013.01); *G06F 11/1433* (2013.01); *G06F 13/4221* (2013.01); *G06F 2201/86* (2013.01); *G06F 2213/0024* (2013.01)

(58) Field of Classification Search
CPC .......... H04N 5/63; H04N 5/455; H04N 7/015; H04N 21/4436; H04N 21/4263; H04N 21/6143; G06F 1/26; G06F 1/32; G06F 1/3209; G06F 1/325; G06F 9/4411; G06F 8/61; G06F 11/1433; G06F 13/4221; G06F 2213/0024; G06F 8/65
See application file for complete search history.

(56) References Cited

U.S. PATENT DOCUMENTS

| | | | |
|---|---|---|---|
| 6,434,696 B1 | 8/2002 | Kang | |
| 6,718,461 B1 | 4/2004 | Ewertz | |
| 6,883,091 B2 | 4/2005 | Morrison et al. | |
| 7,409,537 B2 | 8/2008 | Tsang | |
| 7,568,195 B2 | 7/2009 | Markley et al. | |
| 7,584,467 B2 | 9/2009 | Wickham et al. | |
| 7,730,295 B1* | 6/2010 | Lee ........................ | G06F 9/4401 713/100 |
| 8,412,816 B2 | 4/2013 | Jreij et al. | |
| 9,405,526 B2 | 8/2016 | Thapar et al. | |
| 2005/0223209 A1 | 10/2005 | Chang | |
| 2010/0153615 A1* | 6/2010 | Baba ................... | G06F 13/4022 710/316 |
| 2011/0004780 A1* | 1/2011 | Hirata ................. | G06F 11/0793 714/2 |
| 2011/0161646 A1* | 6/2011 | Yu ......................... | G06F 9/4401 713/2 |

(Continued)

*Primary Examiner* — Jaweed A Abbaszadeh
*Assistant Examiner* — Gayathri Sampath
(74) *Attorney, Agent, or Firm* — Norton Rose Fulbright US LLP (57) ABSTRACT

An information handling system may reset components logged in a memory of the information handling system. For example, an information handling system may determine components logged in an information handling system memory and may perform a bulk reset of the logged components.

15 Claims, 7 Drawing Sheets

(56) References Cited

U.S. PATENT DOCUMENTS

| | | | |
|---|---|---|---|
| 2012/0144231 A1* | 6/2012 | Yagi | G06F 11/1441 |
| | | | 714/4.5 |
| 2014/0068585 A1* | 3/2014 | Young | G06F 8/65 |
| | | | 717/168 |
| 2015/0121355 A1* | 4/2015 | Chang | G06F 8/65 |
| | | | 717/168 |
| 2016/0231804 A1* | 8/2016 | Bulusu | G06F 1/3287 |
| 2016/0283221 A1* | 9/2016 | Kochar | G06F 9/45558 |
| 2018/0165082 A1* | 6/2018 | Batchelor | G06F 8/65 |
| 2018/0165101 A1 | 6/2018 | Bulusu et al. | |

* cited by examiner

INFORMATION HANDLING SYSTEM ADAPTIVE COMPONENT RESET

FIELD OF THE DISCLOSURE

The instant disclosure relates to information handling system rebooting. More specifically, portions of this disclosure relate to resetting components during a reboot of an information handling system.

BACKGROUND

As the value and use of information increase, individuals and businesses seek additional ways to process and store information. One option available for such a purpose is the information handling system. An information handling system generally processes, compiles, stores, and/or communicates information or data for business, personal, or other purposes thereby allowing users to take advantage of the value of the information. Because technology and information handling requirements vary between different users or applications, information handling systems may also vary regarding what information is handled, how the information is handled, how much information is processed, stored, or communicated, and how quickly and efficiently the information may be processed, stored, or communicated. Variations in information handling system build and capabilities allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Users may reboot information handling systems for a variety of reasons. For example, a user may power down an information handling system to save energy when the system is not in use. As another example, a user may reboot an information handling system in order to install hardware, firmware, and/or software updates.

When an information handling system is powered on, the system executes a booting process to initialize hardware and software for use. For example, information handling systems may load and initialize drivers, inventory hardware components, apply hardware, firmware, and software updates, and load and boot an operating system (OS) of the information handling system. Booting and/or rebooting an information handling system may require a substantial amount of time, sometimes reaching or even exceeding 10 minutes, which can negatively impact a user experience. The boot time can be particularly long for information handling systems with large amounts of hardware, such as servers. Often information handling systems include multiple components that must be inventoried, initialized, and allocated resources prior to booting an operating system. Extended booting times may cause users to delay rebooting, even when system updates are ready for installation, which may increase the risk of system failures or security breaches.

Shortcomings mentioned here are only representative and are included simply to highlight that a need exists for improved information handling systems. Embodiments described herein address certain shortcomings but not necessarily each and every one described here or known in the art. Furthermore, embodiments described herein may present other benefits than, and be used in other applications than, those of the shortcomings described above.

SUMMARY

Rebooting an information handling system in order to reset components may require a significant amount of time. For example, performing a platform reboot of an information handling system every time a component reset is needed may require significant system downtime. Furthermore, resetting all information handling system components when a reboot of an information handling system is required can substantially increase reboot time. The downtime required for system reboots, such as when an operating system of an information handling system crashes or when firmware updates are downloaded and applied to system components, may negatively impact a user experience. Downtime may be reduced by resetting components at operating system runtime, bypassing a system reboot altogether, or by performing a bulk reset of only information handling system components that require a reset during a system reboot.

Information handling system components may be reset based on a log of components to be reset. For example, a method for resetting information handling system components may begin with determining one or more system components for resetting based on a log of components for resetting. After the components for resetting are determined, the information handling system may reset the components.

In some cases firmware updates for one or more peripheral component interconnect (PCI) components may be received by an information handling system. Rebooting an information handling system to reset such components individually, as updates become ready for application to the components, can require up to three or four minutes per component. However, bypassing rebooting of the information handling system altogether and resetting the components at operating system runtime may reduce system downtime required for component reset to below five seconds per component. For example, information handling system PCI components that support an Advanced Configuration and Power Interface (ACPI) Reset (_RST) function may be reset at runtime of an operating system of an information handling system without requiring a system reboot. An information handling system may detect receipt of one or more firmware updates for one or more PCI components. The information handling system may log the components in a log of the information handling system. For example, the information handling system may store identifiers for the components in an operating system memory or a non-volatile random access memory (NVRAM) of the information handling system, such as in a PCI device reset queue. When an information handling system is ready to reset the components, such as when a plurality of component firmware updates have completed installation and require component resets for application to the components, the information handling system may reset the one or more PCI components based on the identifiers stored in the memory. Thus, resetting information handling system components at operating system runtime without requiring a reboot of an information handling system may reduce system downtime and improve a user experience.

In some cases, one or more PCI components may not support PCI component resetting at operating system runtime. Thus, a reboot of the information handling system may be performed in order to apply firmware updates to one or more PCI components. In such cases, the PCI device reset queue including identifiers for PCI devices to be reset may be stored in an NVRAM of the information handling system. When the information handling system is rebooted, the information handling system may reset the logged components during rebooting. For example, instead of resetting every component of the information handling system, the system may reset only logged components and may load data stored at a prior boot operation to restore the remaining components. An information handling system may determine components to be reset based on a log of components to be reset. Resetting only the components requiring a reset, such as components that caused a crash of the operating system of the information handling system or PCI components requiring a reset for application of one or more firmware updates, may reduce a reboot time for the information handling system.

PCI components may require a reset in order to complete installation of one or more firmware updates. An information handling system may receive one or more firmware updates for one or more PCI components and may begin installation of each of the firmware updates. As each firmware update reaches a stage in installation requiring a component reset, such as a reset at operating system runtime or a reset during a system reboot, to apply the firmware update to corresponding PCI components, the information handling system may log the PCI components. For example, a list of PCI components with firmware updates ready for application at a subsequent reboot may be stored in an NVRAM of the information handling system. Register settings for each of the one or more PCI components for which firmware updates are being installed may also be saved in a memory, such as an operating system memory or an NVRAM, of the information handling system. In some embodiments, register settings may be saved when the PCI components are logged, while in other embodiments, register settings for all PCI components may be saved at a boot of the information handling system.

Components of an information handling system may also be reset if the components cause a crash of an operating system of the information handling system. An information handling system may detect a crash of an operating system and determine one or more components of the information handling system that triggered the crash. For example, the information handling system may determine that the crash of the operating system included a firmware crash and may determine one or more components running the firmware that crashed. The components running the crashed firmware may be logged in an NVRAM of the information handling system and may be reset when the system reboots.

An information handling system may include a processor for performing the steps described herein. Furthermore, an information handling system may include a memory, such as an NVRAM, for storing instructions, a list of components to be reset, register settings for reset components, and/or other information required or useful in resetting components. Instructions for performing the steps described herein may be stored on a non-transitory computer readable medium.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, a two-in-one laptop/tablet computer, mobile device (e.g., personal digital assistant (PDA), smart phone, tablet computer, or smart watch), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more virtual or physical buses operable to transmit communications between the various hardware and/or software components.

Figure 1:
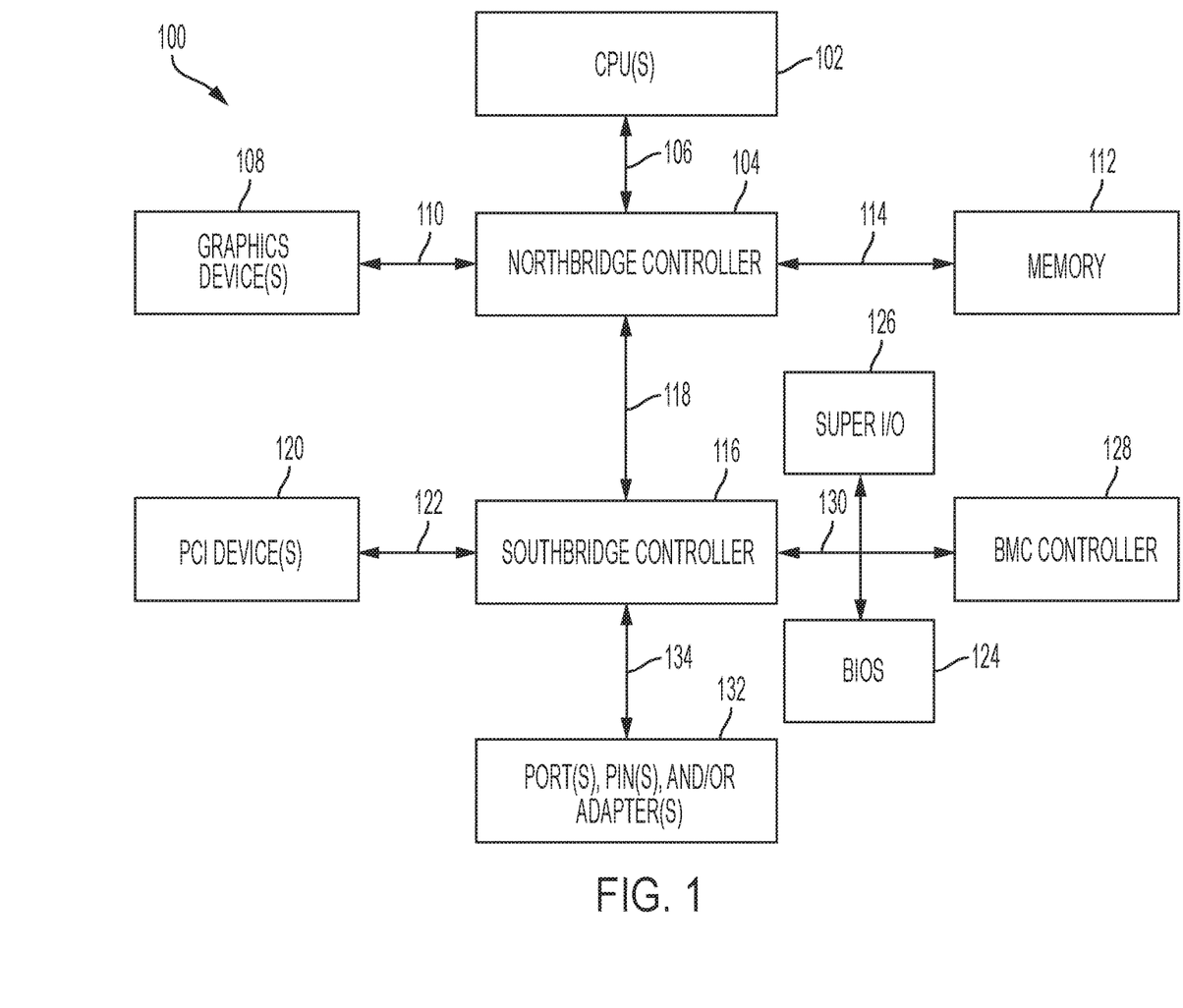
FIG. 1 is a schematic block diagram of an example information handling system according to some embodiments of the disclosure.

An information handling system may include a variety of components to generate, process, display, manipulate, transmit, and receive information. One example of an information handling system 100 is shown in FIG. 1. IHS 100 may include one or more central processing units (CPUs) 102. In some embodiments, IHS 100 may be a single-processor system with a single CPU 102, while in other embodiments IHS 100 may be a multi-processor system including two or more CPUs 102 (e.g., two, four, eight, or any other suitable number). CPU(s) 102 may include any processor capable of executing program instructions. For example, CPU(s) 102 may be processors capable of implementing any of a variety of instruction set architectures (ISAs), such as the x86, POWERPC®, ARM®, SPARC®, or MIPS® ISAs, or any other suitable ISA. In multi-processor systems, each of CPU(s) 102 may commonly, but not necessarily, implement the same ISA.

CPU(s) 102 may be coupled to northbridge controller or chipset 104 via front-side bus 106. The front-side bus 106 may include multiple data links arranged in a set or bus configuration. Northbridge controller 104 may be configured to coordinate I/O traffic between CPU(s) 102 and other components. For example, northbridge controller 104 may be coupled to graphics device(s) 108 (e.g., one or more video cards or adaptors, etc.) via graphics bus 110 (e.g., an Accelerated Graphics Port or AGP bus, a Peripheral Component Interconnect or PCI bus, etc.). Northbridge controller 104 may also be coupled to system memory 112 via memory bus 114. Memory 112 may be configured to store program instructions and/or data accessible by CPU(s) 102. In various embodiments, memory 112 may be implemented using any suitable memory technology, such as static RAM (SRAM), synchronous dynamic RAM (SDRAM), nonvolatile/Flash-type memory, or any other type of memory. In some embodiments memory 112 may include NVRAM. In other embodiments, NVRAM may be separately included in or coupled to CPU 102.

Northbridge controller 104 may be coupled to southbridge controller or chipset 116 via internal bus 118. Generally, southbridge controller 116 may be configured to handle various of IHS 100's I/O operations, and it may provide interfaces such as, for instance, Universal Serial Bus (USB), audio, serial, parallel, Ethernet, etc., via port(s), pin(s), and/or adapter(s) 132 over bus 134. For example, southbridge controller 116 may be configured to allow data to be exchanged between IHS 100 and other devices, such as other IHSs attached to a network. In various embodiments, southbridge controller 116 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 116 may also enable connection to one or more keyboards, keypads, touch screens, scanning devices, voice or optical recognition devices, or any other devices suitable for entering or retrieving data. Multiple I/O devices may be present in IHS 100. In some embodiments, I/O devices may be separate from IHS 100 and may interact with IHS 100 through a wired or wireless connection. As shown, southbridge controller 116 may be further coupled to one or more PCI devices 120 (e.g., modems, network cards, sound cards, video cards, etc.) via PCI bus 122. Southbridge controller 116 may also be coupled to Basic I/O System (BIOS) 124, Super I/O Controller 126, and Baseboard Management Controller (BMC) 128 via Low Pin Count (LPC) bus 130. Super I/O controller 126 may combine interfaces for a variety of lower bandwidth or low data rate devices. Those devices may include, for example, floppy disks, parallel ports, keyboard and mouse, temperature sensor and fan speed monitoring, etc.

BIOS 124 may include non-volatile memory, such as NVRAM, having program instructions stored thereon. The instructions stored on the BIOS may be usable CPU(s) 102 to initialize and test other hardware components and/or to load an Operating System (OS) onto IHS 100, for example during a booting of an information handling system. The NVRAM of the BIOS may store a boot flag and instructions for performing a quick boot or a detailed boot based on a status of the boot flag. In some embodiments, the NVRAM of the BIOS may also store a boot map and booting information for performing a quick boot. As such, BIOS 124 may include a firmware interface that allows CPU(s) 102 to load and execute certain firmware. In some cases, such firmware may include program code that is compatible with the Unified Extensible Firmware Interface (UEFI) specification, although other types of firmware may be used.

BMC controller 128 may include non-volatile memory having program instructions stored thereon that are usable by CPU(s) 102 to enable remote management of IHS 100. For example, BMC controller 128 may enable a user to discover, configure, and manage BMC controller 128, setup configuration options, resolve and administer hardware or software problems, etc. Additionally or alternatively, BMC controller 128 may include one or more firmware volumes, each volume having one or more firmware files used by the BIOS' firmware interface to initialize and test components of IHS 100.

In some cases, IHS 100 may be configured to access different types of computer-accessible media separate from memory 112. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to IHS 100 via northbridge controller 104 and/or southbridge controller 116.

In some implementations, northbridge controller 104 may be combined with southbridge controller 116, and/or be at least partially incorporated into CPU(s) 102. In other implementations, one or more of the devices or components shown in FIG. 1 may be absent, or one or more other components may be added. Accordingly, systems and methods described herein may be implemented or executed with other computer system configurations. In some cases, various elements shown in FIG. 1 may be mounted on a motherboard and protected by a chassis or the like.

Figure 2:
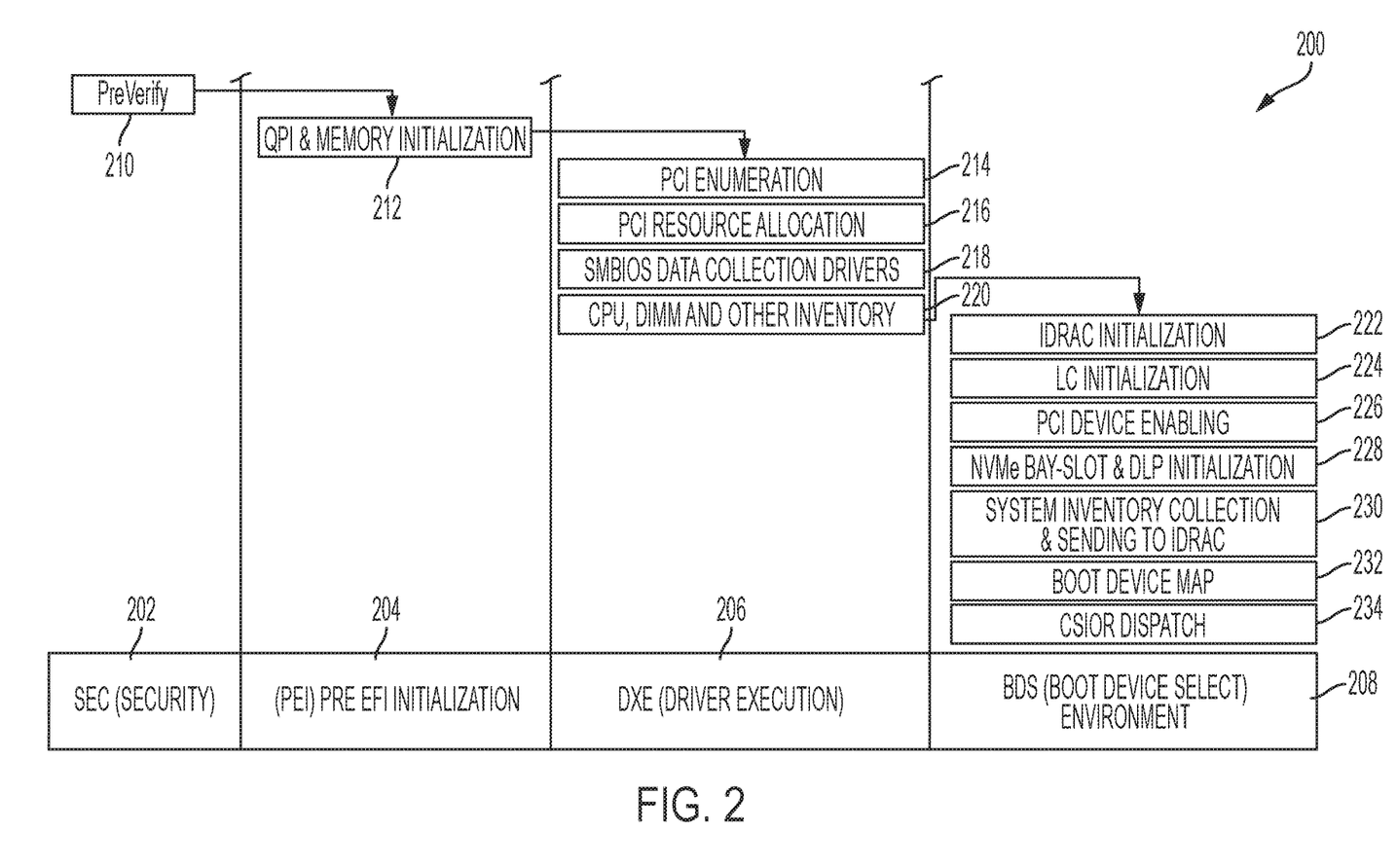
FIG. 2 is a process diagram of example information handling system detailed boot operation according to some embodiments of the disclosure.

When an information handling system is powered up, for example during a rebooting process, the information handling system may begin a booting process wherein a BIOS/UEFI may initialize and configure hardware and firmware, prepare the information handling system for booting of the operating system, and boot the operating system. An example process diagram 200 of a detailed booting process for an information handling system is shown in FIG. 2. The detailed booting process may allow for a full inventory of hardware and firmware, including installation of hardware and firmware updates that may have been downloaded following a prior booting process. After an IHS is powered on, the IHS may enter a security phase 202 where the BIOS/UEFI may perform a pre-verify operation 210 to examine the security certificate and verify that the device is ready for secure operation.

After the security phase 202, the IHS may enter a pre-extensible firmware interface initialization phase 204, wherein the IHS may perform Quick Path Interconnect (QPI) and memory initialization 212. During the Quick Path Interconnect and memory initialization 212, among other tasks the information handling system may check a boot flag to determine whether to perform a quick boot, as discussed with respect to FIG. 3, or detailed boot, as discussed with respect to FIG. 2, based on whether a reboot requires installation of a hardware or firmware update. Alternatively, the information handing system may check the boot flag after performing a Quick Path Interconnect and memory initialization 212. After the Quick Path Interconnect and memory are initialized, the IHS may enter a driver execution phase 206.

During the driver execution phase 206, the information handling system may perform Peripheral Component Interconnect (PCI) enumeration 214 to detect, configure, and/or initialize any devices connected to and/or integrated in the information handling system. After performing PCI enumeration 214, the IHS may perform PCI resource allocation 216 to allocate resources, such as memory, to the detected devices. The IHS may then execute 218 system management basic input/output system (SMBIOS) data collection drivers before inventorying 220 the CPU, dual in-line memory modules (DIMMs), and/or other system elements. After the IHS has completed the driver execution phase 206, the IHS may proceed to a boot device select (BDS) environment phase 208 for selection of a boot device.

The IHS may perform integrated remote access controller initialization 222, such as initialization of a BMC. One example of a BMC may include an integrated Dell Remote Access Controller (iDRAC). The IHS may then perform line card (LC) initialization 224 and may enable PCI devices 226. The IHS may then perform non-volatile memory express (NVMe) bay-slot and data loss prevention (DLP) initialization 228. The IHS may then collect system inventory and send the system inventory to the integrated remote access controller 230. The IHS may map the boot device 232 and may perform a dispatch 234 of collected system inventory on restart (CSIOR). The information handling system may boot the operating system from the mapped boot device.

In order to facilitate a quick boot, the information handling system may save information from the detailed booting process in NVRAM. For example, the information handling system may save PCI resource allocation 216 information, SMBIOS data collection driver 218 information, CPU and DIMM and other system component inventory 220 information, PCI device enablement 226 information, a boot device map 232, and/or other information gathered during the booting process in a NVRAM of the information handling system. The information handling system may then access saved boot information during a quick boot to bypass one or more steps corresponding to portions of the saved and reusable boot data that are performed during a detailed boot.

Figure 3:
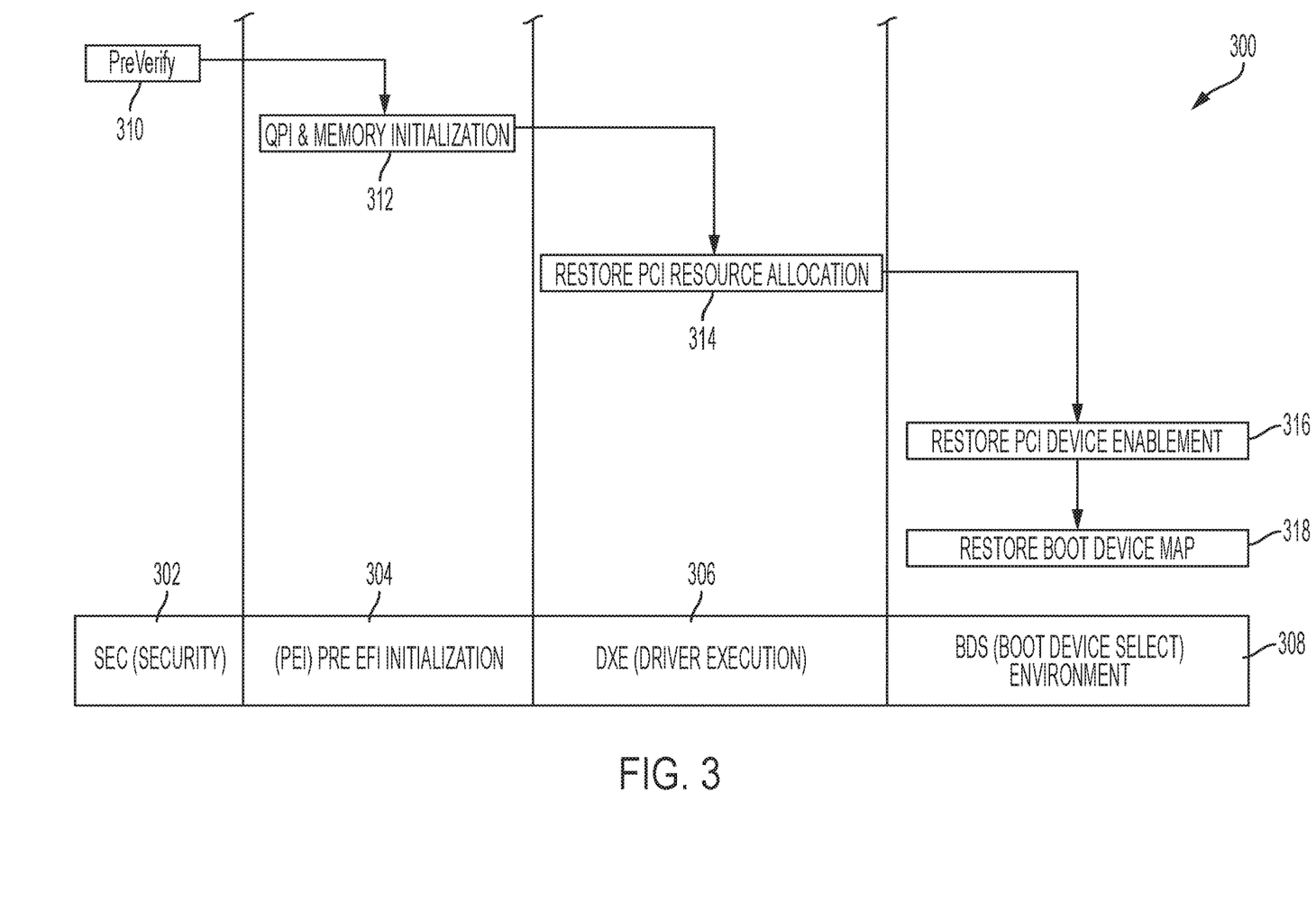
FIG. 3 is an illustration of an example information handling system quick boot operation according to some embodiments of the disclosure.

As one example, when an information handling system is booted without installation of any firmware or hardware updates, the information handling system may perform a quick boot to reduce booting time and enhance a user experience. For example, when an information handling system is rebooted for installation of a software update, without any firmware or hardware updates, the information handling system may engage in a quick boot when restarting the system. Alternatively or additionally, an information handling system may engage in a quick boot when the system is shut down by a user, without any hardware or firmware updates set for installation, and powered up by the user at a later time. An example quick boot process 300 is shown in FIG. 3. When an information handling system is powered on, it may initialize a booting process by entering a security phase 302. In the security phase 302, the information handling system may perform a pre-verify operation 310 to examine the security certificate and verify that the information handling system is ready for secure operation. The information handling system may then enter a pre-extensible firmware interface initialization phase 304 where it may perform QPI and memory initialization 312. During or following the QPI and memory initialization 312, the information handling system may determine whether to perform a quick boot or a detailed boot. For example, the information handling system may check a boot flag stored in NVRAM to determine whether installation of hardware or firmware updates is required.

If installation of hardware or firmware updates is not required, the information handling system may bypass a variety of steps performed in a quick booting process such as BIOS POST operations and/or mapping of a boot device. An advanced configuration and power interface (ACPI) driver may include functionality to restart the kernel during a quick boot, while bypassing a variety of BIOS POST operations. The ACPI driver may be configured to interact with the NVRAM boot flag to determine if a hardware or software update is required. An ACPI register reset may also be initiated when installation of a software update includes modification of a device configuration or one or more drivers. For example, after QPI and memory initialization 312 is performed, the information handling system may enter a driver execution (DXE) phase 306. During the driver execution phase, instead of performing PCI enumeration, allocating PCI resources, executing SMBIOS data collection drivers, and inventorying CPUs DIMMs and other system components, as would be performed in a detailed boot, the information handling system may restore 314 a PCI resource allocation from an NVRAM storage location. For example, the information handling system may restore 314 a PCI resource allocation that was stored in NVRAM during a prior boot, such as the example detailed boot of FIG. 2. The information handling system may also restore SMBIOS data collection driver information and inventory information for CPUs, DIMMs, and other system components. The information handling system may then enter a boot device select (BDS) phase 308. During the boot device select phase 308, instead of performing BMC initialization, such as iDRAC initialization, LC initialization, NVMe bay slot and DLP initialization, system inventory collection and transmittal to the iDRAC, and CSIOR dispatch as performed during a detailed boot, the information handling system may restore system information from NVRAM. The information handling system may restore 316 PCI device enabling information and may enable PCI devices based on the restored information. In some embodiments, the information handling system may reset PCI devices for which firmware updates have been installed, while restoring operation of PCI devices that are not updated without resetting such devices. In other embodiments, the information handling system may reset devices, such as PCI devices, that caused a crash of an operating system of the information handling system while restoring operation of devices that are not running the crashed firmware. The information handling system may then restore 318 a boot device map stored in NVRAM and may proceed to boot an operating system of the information handling system. For example, the information handling system may restore PCI device enabling information and a boot device map that were stored in NVRAM during the prior detailed boot process. In some embodiments, the boot device map that is restored may be a last known good map of boot devices. Although certain steps are shown as omitted from the detailed boot of FIG. 2 from the quick boot of FIG. 3 other combinations of steps from FIG. 2 may be omitted in the quick boot of FIG. 3.

Figure 4:
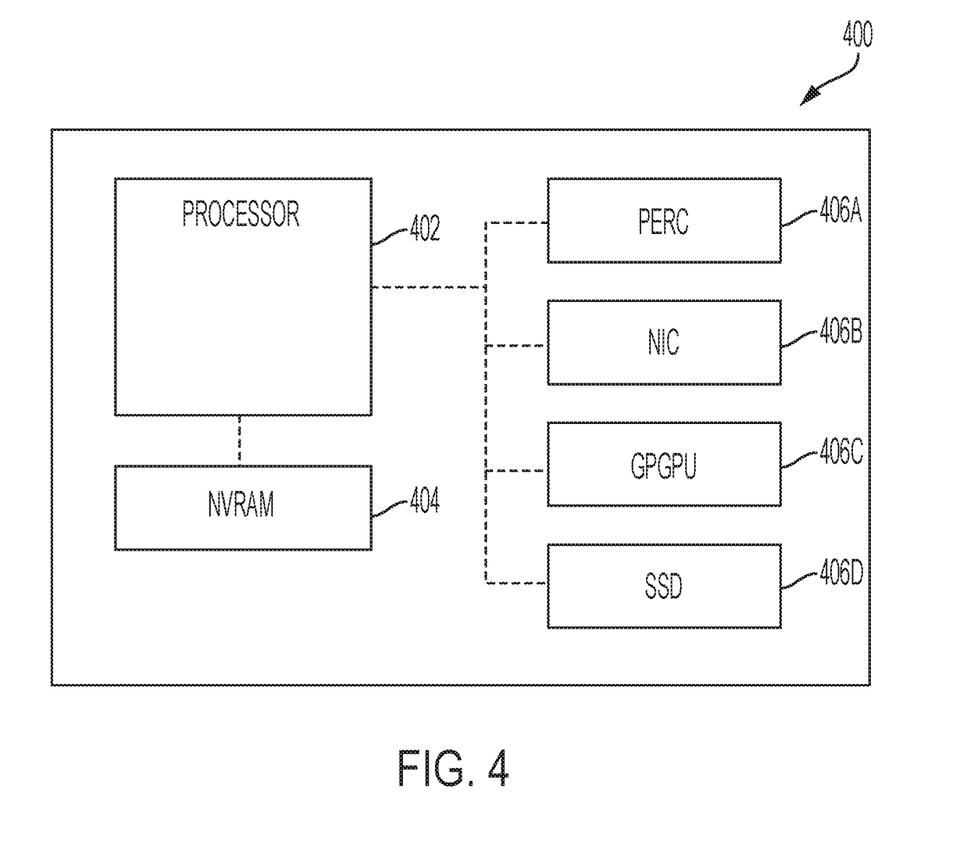
FIG. 4 is a block diagram of an example information handling system including a plurality of PCI components according to some embodiments of the disclosure.

An information handling system may include a plurality of PCI components. Firmware for PCI components may, from time to time, be updated to enhance stability, remove bugs, and/or enhance functionality. An example information handling system 400 is shown in FIG. 4. An information handling system 400 may include a processor 402 and an NVRAM 404. An information handling system 400 may also include a variety of PCI devices 406A-D, such as a PowerEdge Redundant Array of Independent Disks (RAID) Controller (PERC) 406A, a network interface controller (NIC) 406B, a general-purpose graphics processing unit (GPGPU) 406C, and a solid state drive (SSD) 406D. When a firmware update is received by information handling system 400 for a PCI device, such as PERC 406A, the information handling system may begin installing the firmware update. When installation of the update has reached a stage requiring a component reset for application of the firmware to the PERC 406A, the PERC 406A may be logged in a PCI reset queue of the NVRAM 404 and/or in a PCI reset queue of an operating system memory. Furthermore, register settings for logged PCI components may be stored in NVRAM and/or an operating system memory and may be loaded when resetting PCI components. When the information handling system is finished installing one or more updates, such as upon a trigger initiated by a firmware update program framework, an ACPI driver may call an ACPI_RST function to reset the components in the PCI component reset queue, to finish application of the firmware updates to the components. Resetting the PCI components at runtime can avoid a time consuming full system reboot. The components being reset at operating system runtime may support ACPI version 6.2, to support resetting using an _RST function. In some cases, an information handling system may include components that do not support application of firmware updates via component resetting at OS runtime. In such cases, the information handling system may be rebooted, and may reset the PCI components in the PCI reset queue and restore saved register settings while the system is rebooting.

Figure 5:
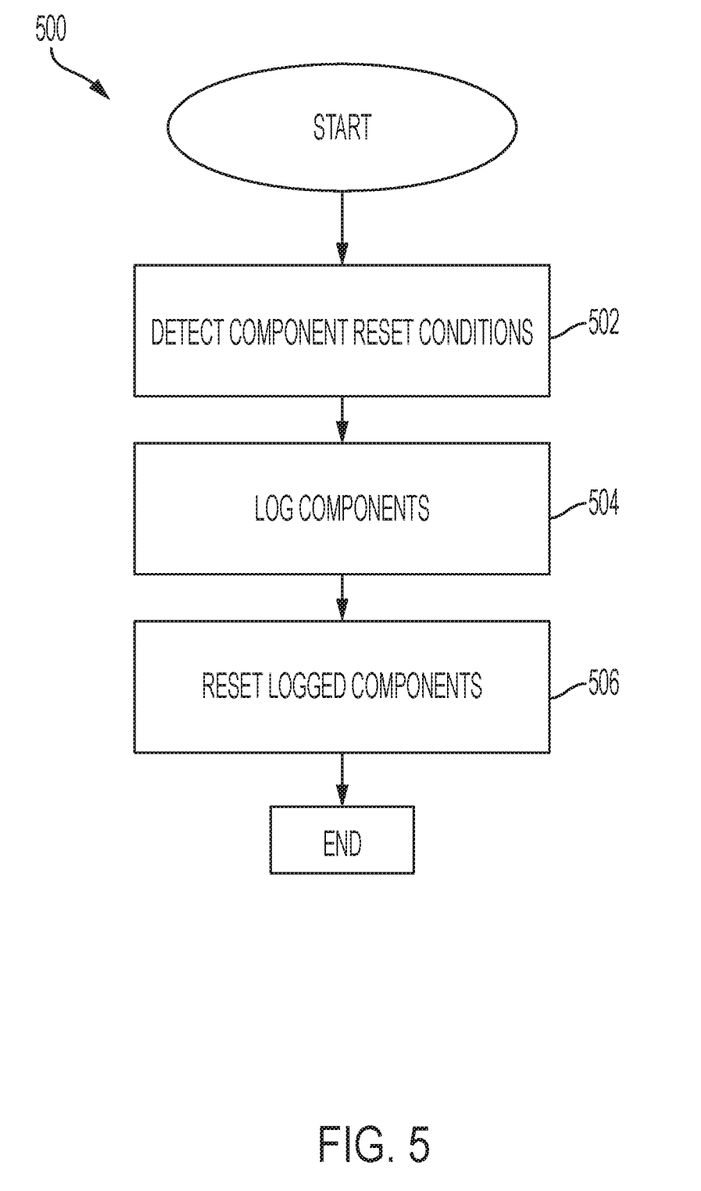
FIG. 5 is a flow chart of an example method for adaptive resetting of information handling system components according to some embodiments of the disclosure.

An information handling system may reset one or more components based on a log of components for resetting. For example, an information handling system may reset PCI components to which firmware updates are being applied at operating system runtime. If the PCI components do not support resetting at operating system runtime, the information handling system may perform a system reboot and may reset only PCI components for which firmware updates are being installed during the reboot. In some cases, an operating system crash of an information handling system may be caused by one or more system components. To recover from the crash, the system may reboot and may reset components which are determined to have caused a crash of the operating system of the information handling system. By resetting only logged components during a system reboot, instead of all components, or by avoiding a system reboot altogether when installing component firmware updates, information handling system downtime may be reduced. An example method 500 for adaptive resetting of information handling system components is shown in FIG. 5. The method 500 begins, at step 502, with detecting reset conditions for components. For example, an information handling system may detect receipt of one or more firmware updates for one or more PCI components of an information handling system. Alternatively or additionally, an information handling system may detect a crash of an operating system of an information handling system and may determine one or more components that caused the crash. An information handling system may log components that are to be reset. For example, an information handling system may store component identifiers for components to be reset, at step 504, in a memory of the information handling system, such as an NVRAM or operating system memory. Other information associated with the components to be reset may also be stored in the memory, such as device register settings for the components to be reset.

At step 506, the logged components may be reset. For example, an ACPI driver of the information handling system may issue an _RST function call, such as an ACPI Machine Language (AML) function call, to reset the logged PCI components at runtime of an operating system of the information handling system. The components may then be reset and the operating system may restore configuration settings and operation of the components by restoring saved register and/or configuration settings for the reset components. In some embodiments, a system reboot may be required in order to reset components. For example, firmware updates may be downloaded for information handling system components that do not support resetting at operating system runtime. As another example, an operating system crash may detected and a reboot including one or more component resets may be required to recover from the operating system crash. In such embodiments, the information handling system may perform a system reboot and the logged components may be reset while the information handling system is rebooting. For example, an information handling system may reboot in response to a user instruction to shut down or reboot. Alternatively or additionally, an information handling system may reboot automatically after a crash or after a firmware update is received and installed. For example, an information handling system may reboot automatically when a plurality of updates scheduled for installation have reached a stage where a component reset is required to complete installation. Alternatively or additionally, an information handling system may reboot following a crash of an operating system to recover from the crash. In some embodiments, the information handling system may perform a soft boot such as a quick boot, as described with respect to FIG. 3, but with an additional step of resetting one or more components of the information handling system. For example, before performing step 314, of FIG. 3, the information handling system may reset the logged components. The information handling system may examine a log of components to be reset stored in NVRAM and may reset components indicated in the log. Resetting components may include applying firmware updates for the components and/or reloading a last known good map of the components. Information for components not indicated in the log may be loaded and used to initialized such components, without resetting them as described with respect to the quick boot of FIG. 3. Resetting only components that require a reset, such as components with updated firmware or components that caused a system crash, or bypassing a system reboot altogether may substantially reduce information handling system downtime.

Figure 6:
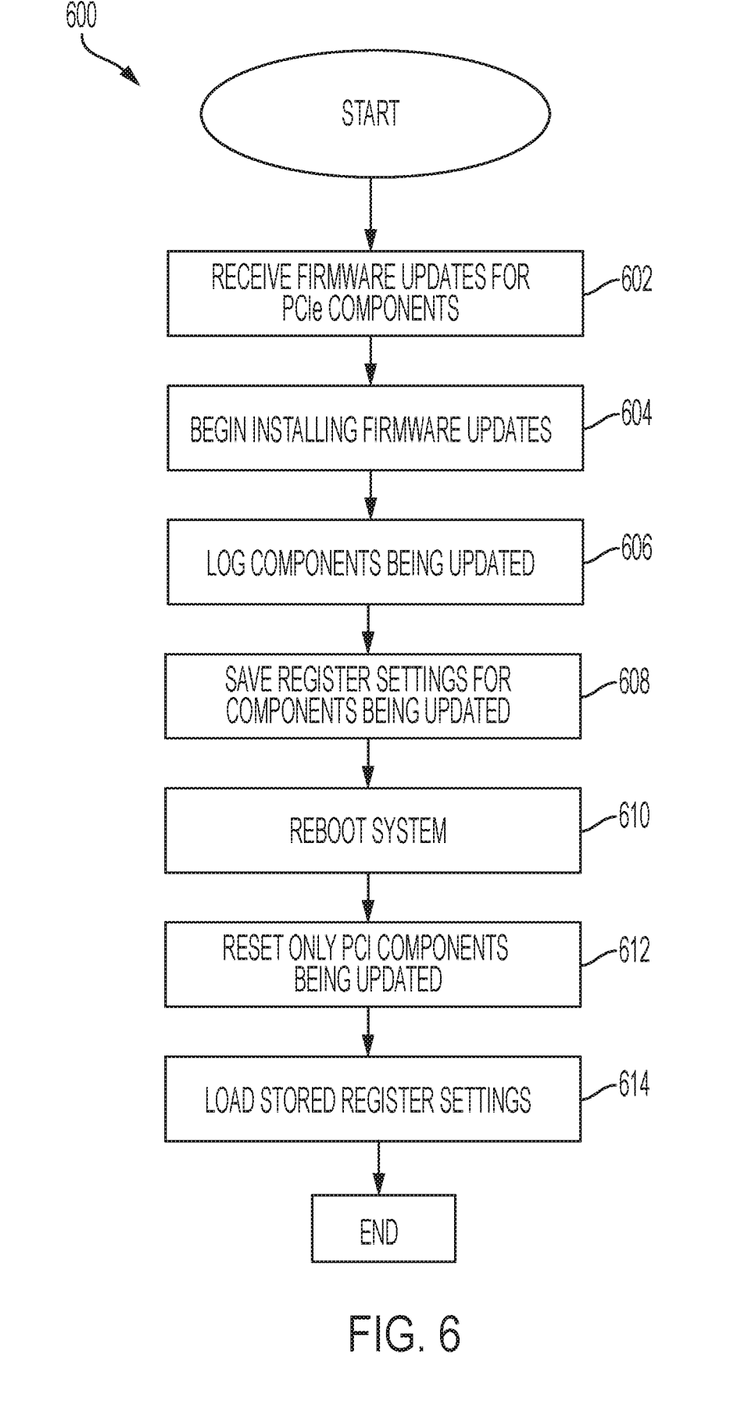
FIG. 6 is a flow chart of an example method for resetting updated PCI components of an information handling system according to some embodiments of the disclosure.

Information handling systems may include multiple PCI components, which may receive firmware updates from time to time. For example, firmware updates for PCI components may be pushed from a remote server, downloaded, or copied locally. The PCI components may be reset at operating system runtime to apply the firmware updates. If firmware updates are received for PCI components that do not support operating system runtime resetting, an information handling system may reboot to perform a bulk component reset and bulk application of firmware updates to the PCI components. In such cases, an information handling system may perform a quick boot and may reset only PCI devices for which firmware updates are being installed in order to reduce boot time. The information handling system may also apply multiple updates to multiple components in a single reboot. A method 600 for resetting PCI components with updated firmware is shown in FIG. 6. The method 600 may begin, at step 602, with receipt of one or more firmware updates for one or more PCIe components. For example, an information handling system may receive a plurality of firmware updates for a plurality of PCIe components.

After a firmware update is received, an information handling system may install the firmware update, at step 604. For example, an information handling system may receive a first firmware update and may begin installing the first firmware update. Subsequently, the information handling system may receive a second firmware update and may begin installing the second firmware update. Alternatively or additionally, the information handling system may receive an update package, such as a Dell Update Package (DUP), containing a plurality of firmware updates for one or more PCI components. The information handling system may begin installation of each of the firmware updates in the package.

At step 606, the information handling system may log components being updated. For example, as firmware updates are being installed, an information handling system may record identifiers for PCI components to which the firmware updates apply, such as PCI-ID device information, in a PCI device reset queue stored in a memory of the information handling system, such as an NVRAM. In some cases, the information handling system may log a component being updated when installation of firmware has reached a point requiring a component reset for application of the update to the component. For example, if multiple firmware updates are received, an information handling system may install the updates as they are received and may record PCI components to which each update applies as installation of each update reaches a point requiring a component reset. Multiple firmware updates may be set for completion of installation and component resetting at a future time, and multiple PCI components running the firmware being updated may be logged in a memory of the information handling system.

An information handling system may also save register settings for components being updated, at step 608. For example, as PCI components being updated are logged in a memory of an information handling system, register settings for the components being updated may also be saved in the memory. Alternatively or additionally, an information handling system may save register settings for all PCI devices after each successful boot. In some embodiments, a custom operating system driver may store the register settings in the memory of the information handling system before the components are reset.

At step 610, the information handling system may reboot. For example, in some cases firmware updates may be received for PCI components that do not support resetting at operating system runtime. A user may instruct the information handling system to reboot to complete installation of one or more updates to firmware for one or more PCI components. In some cases, a user may install multiple PCI firmware updates before instructing the system to reboot, so that multiple PCI devices are logged for resetting when the system is rebooted. An information handling system may automatically reboot to complete installation of one or more updates to firmware for one or more PCI components after installation of one or more firmware updates reaches a stage requiring a reboot to complete installation. If resetting at operating system runtime is supported by PCI components for which firmware updates are received, step 610 may be bypassed, and an ACPI driver may reset the components to apply the firmware updates to the components at operating system runtime.

At step 612, the information handling system may reset only PCI components that are being updated. The information handling system may include an updated advanced configuration and power interface (APCI) driver to facilitate resetting of updated PCI components. The information handling system may also include one or more updated PCI drivers, such as PCIe drivers following the ACPI specification 6.2, to allow for resetting of specific PCI components at OS runtime. PCI components that are being updated may require resetting to apply firmware updates that are being installed. However, performing multiple system reboots and/or resetting all PCI devices with each system reboot may require a substantial amount of time, in some cases exceeding ten minutes. Thus, the information handling system may reset the PCI components with updated firmware at operating system runtime to apply firmware updates without rebooting the information handling system. For example, PCI components in compliance with the ACPI specification 6.2 and later may be reset at operating system runtime to apply the firmware updates to the components. An ACPI driver may check a PCI device reset queue stored in an NVRAM of the information handling system to determine which PCI components are to be reset. The ACPI driver may inventory PCI configuration space for the devices to be reset. The ACPI driver may then call a device reset function, such as an _RST method, resetting each device, and may remove each device from the PCI device reset queue as each device is reset. If firmware updates are received for one or more PCI components that do not support component resetting at operating system runtime, the information handling system may reboot, as described with respect to step 610, and while rebooting may reset only logged PCI components. For example, an information handling system may perform a quick boot, as described with respect to FIG. 3, where resetting of PCI devices may be bypassed by default, but may reset PCI components for which firmware updates are being installed, to complete installation of the updates.

At step 614, the information handling system may load stored register settings for the updated PCI devices. For example, the information handling system may restore configurations settings for the reset PCI device. In some embodiments, an operating system driver of the information handling system may restore PCI resource allocation and device enablement for all PCI components after the components being updated are reset. If the information handling system was rebooted to reset the PCI components, the updated PCI components may be reset, and register settings for the updated PCI components may be restored from memory, while mappings for PCI components that are not being updated may be restored from memory, enabling the non-updated PCI components without requiring a reset.

Figure 7:
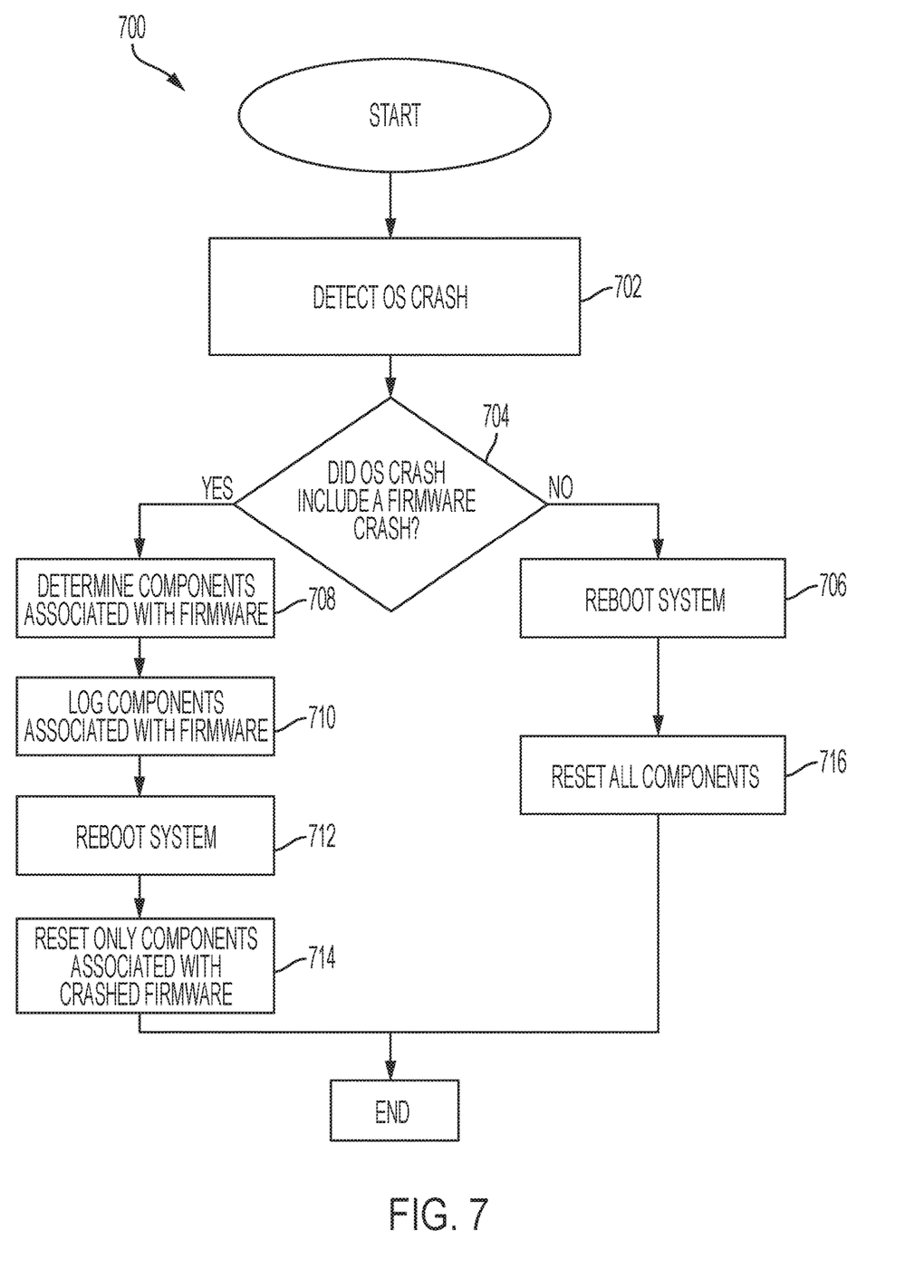
FIG. 7 is a flow chart of an example method for resetting components that caused a crash of an operating system of an information handling system according to some embodiments of the disclosure.

Information handling systems may reset components that caused a crash of an information handling system, while restoring, without resetting, operation of components that did not cause the crash. A method 700 for resetting components that caused a crash of an information handling system is shown in FIG. 7. The method 700 may begin, at step 702, with detecting a crash of an operating system of the information handling system. For example, an information handling system may encounter one or more errors requiring a kernel reset. When a crash is detected, an information handling system may display a blue screen or purple screen with text describing the nature of the crash.

After the crash of the operating system is detected, the information handling system may, at step 704, determine whether the operating system included a firmware crash. For example, when operating system crashes, a crash handler of the information handling system may collect error information indicating one or more causes of the crash of the operating system and may store the collected information in a system event log. In some cases, an operating system crash may be caused by a kernel error in an operating system or driver, while in others a crash may be caused by firmware of one or more components of an information handling system. In still other cases, an operating system crash may be caused by a combination of kernel and firmware errors. The information collected may include information specifying firmware, if any, that caused the crash and system components, such as PCI components, to which the crashed firmware applies. For example, the information handling system may save information detailing detected errors, such as detected fatal errors and firmware and system components associated with the errors.

If the OS crash is determined not to include a firmware crash, the information handling system may, at step 706, reboot the system. In some cases, if the crash handler is unable to determine firmware that caused the operating system to crash or devices running the firmware, the crash handler may set the offending component list to indicate that all devices should be reset. In some embodiments, the information handling system may perform a quick boot, while in other embodiments, the information handling system may perform a detailed boot, if the system is unable to determine one or more devices that caused the operating system to crash. The quick boot may be a soft reboot, including a restart of the kernel while bypassing one or more BIOS POST operations.

At step 716, the information handling system may reset all components. For example, if the information handling system is unable to determine if an operating system crash included a firmware crash, or if the information handling system is unable to determine components running the crashed firmware, the information handling system may adjust an offending component list to indicate that all components should be reset. Thus, if the information handling system is unable to determine one or more components that caused the crash, it may reset all the components and perform a quick boot after the components are reset, as described with respect to FIG. 3. The information handling system may also store register settings associated with each of the reset components, and may restore the register settings after the components are reset. For example, after the components are reset, the information handling system may restore the register settings for the components and load a last known good map from memory to restore component operation.

If the OS crash is determined to include a firmware crash, at step 704, the information handling system may determine, at step 708, which components of the information handling system, such as PCI components, are running the firmware that crashed. A crash handler may examine collected information regarding the crash of the information handling system to identify components, such as PCI components, running crashed firmware. For example, the information handling system may examine a crash log to determine hardware components running the crashed firmware. If the information handling system is unable to determine components running the crashed firmware, it may reset all components, as described with respect to steps 706 and 716.

At step 710, the information handling system may log components running the firmware that crashed. For example, a crash handler of the information handling system may save component identifiers in an offending component list in a memory of the information handling system, such as an NVRAM. Register settings for the components running the crashed firmware may also be stored.

At step 712, the information handling system may reboot. For example, after the components running the firmware have been logged in the memory of the information handling system, the information handling system may automatically reboot. The reboot may, for example, include a quick boot as described with respect to FIG. 3. The quick boot may be a soft reboot, including a restart of the kernel while bypassing one or more BIOS POST operations.

At step 714, the information handling system may reset components running the crashed firmware. For example, in addition to and/or prior to performing the quick boot steps, described with reference to FIG. 3, the information handling system may reset components running the crashed firmware based on the list of offending devices. The information handling system may also restore register settings for each of the reset components and may restore a last known good map of boot devices from a memory of the information handling system. As components are reset, the information handling system may remove the component identifiers from the list of offending components until the list is empty and all offending components have been reset. Thus instead of resetting all components, the information handling system may reset only components running crashed firmware, reducing the amount of time required for rebooting the system and recovering from the operating system crash.

The schematic flow chart diagrams of FIGS. 5-7 are generally set forth as logical flow chart diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
receiving one or more firmware updates for one or more peripheral component interconnect (PCI) components of an information handling system;
updating a first PCI component and a third PCI component of a first subset of the one or more PCI components that does not support resetting at runtime with a first firmware update and a third firmware update, respectively, of the one or more firmware updates;
updating a second PCI component of a second subset of the one or more PCI components that does support resetting at runtime with a second firmware update of the one or more firmware updates;
resetting the second PCI component after updating the second PCI component and before rebooting the information handling system;
logging the first PCI component and the third PCI component in a PCI reset queue of the information handling system after updating the first PCI component and the third PCI component;
rebooting the information handling system after updating the first PCI component and the third PCI component, logging the first PCI component and the third PCI component, and updating the second PCI component; and
resetting the first PCI component and the third PCI component while the information handling system is rebooting, based, at least in part, on the first PCI component and the third PCI component, respectively, being logged in the PCI reset queue.

2. The method of claim 1, further comprising:
beginning installation of each of the one or more firmware updates to the first subset of the one or more PCI components,
wherein the step of logging is performed for each PCI component of the first subset when installation has reached a stage requiring a component reset; and
completing installation of each of the one or more firmware updates to the first subset after rebooting the information handling system.

3. The method of claim 1, further comprising:
saving register settings for each of the one or more PCI components for which one or more firmware updates are being installed,
wherein resetting the one or more logged components comprises loading the device register settings for each of the one or more PCI components for which one or more firmware updates are being installed after resetting each of the logged components.

4. The method of claim 1, further comprising:
detecting a crash of an operating system of the information handling system; and
determining one or more components that caused the crash of the operating system, wherein the logging in the PCI reset queue comprises logging the one or more components that caused the crash of the operating system in the PCI reset queue.

5. The method of claim 4, wherein determining one or more components that caused the crash of the operating system comprises:
determining the crash of the operating system included a firmware crash; and
determining one or more components running the firmware of the firmware crash.

6. An information handling system comprising:
a processor;
wherein the processor is configured to perform steps comprising:
receiving one or more firmware updates for one or more peripheral component interconnect (PCI) components of the information handling system;
updating a first PCI component and a third PCI component of a first subset of the one or more PCI components that does not support resetting at runtime with a first firmware update and a third firmware update, respectively, of the one or more firmware updates;
updating a second PCI component of a second subset of the one or more PCI components that does support resetting at runtime with a second firmware update of the one or more firmware updates;
resetting the second PCI component after updating the second PCI component and before rebooting the information handling system;
logging the first PCI component and the third PCI component in a PCI reset queue of the information handling system after updating the first PCI component and the third PCI component;

rebooting the information handling system after updating the first PCI component, logging the first PCI component, and updating the second PCI component; and resetting the first PCI component and the third PCI component while the information handling system is rebooting, based, at least in part, on the first PCI component and the third PCI component, respectively, being logged in the PCI reset queue.

7. The information handling system of claim 6, wherein the processor is further configured to perform steps comprising:

detecting a crash of an operating system of the information handling system; and determining one or more components that caused the crash of the operating system, wherein the logging in the PCI reset queue comprises logging the one or more components that caused the crash of the operating system in the PCI reset queue.

8. The information handling system of claim 7, wherein determining one or more components that caused the crash of the operating system comprises:

determining the crash of the operating system included a firmware crash; and determining one or more components running the firmware of the firmware crash.

9. A computer program product, comprising:

a non-transitory computer readable medium comprising instructions to perform steps comprising:

receiving one or more firmware updates for one or more peripheral component interconnect (PCI) components of an information handling system;

updating a first PCI component and a third PCI component of a first subset of the one or more PCI components that does not support resetting at runtime with a first firmware update and a third firmware update, respectively, of the one or more firmware updates;

updating a second PCI component of a second subset of the one or more PCI components that does support resetting at runtime with a second firmware update of the one or more firmware updates;

resetting the second PCI component after updating the second PCI component and before rebooting the information handling system;

logging the first PCI component and the third PCI component in a PCI reset queue of the information handling system after updating the first PCI component and the third PCI component;

rebooting the information handling system after updating the first PCI component and the third PCI component, logging the first PCI component and the third PCI component, and updating the second PCI component; and resetting the first PCI component and the third PCI component while the information handling system is rebooting, based, at least in part, on the first PCI component and the third PCI component, respectively, being logged in the PCI reset queue.

10. The computer program product of claim 9, wherein the non-transitory computer readable medium comprises instructions to perform steps further comprising:

detecting a crash of an operating system of the information handling system; and determining one or more components that caused the crash of the operating system, wherein the logging in the PCI reset queue comprises logging the one or more components that caused the crash of the operating system.

11. The method of claim 1, further comprising determining that the second PCI component supports resetting at operating system runtime.

12. The method of claim 1, wherein logging the first PCI component and the third PCI component in the PCI reset queue of the information handling system comprises logging the first PCI component and the third PCI component in a PCI reset queue in a non-volatile random access memory (NVRAM) of the information handling system.

13. The method of claim 12, wherein rebooting the information handling system comprises determining a status of a boot flag in the NVRAM, and wherein resetting the first PCI component and the third PCI component logged in the PCI reset queue while the information handling system is rebooting is performed based on the PCI reset queue when the boot flag is set for a quick boot.

14. The information handling system of claim 6, wherein the processor is configured to perform steps comprising:

beginning installation of each of the one or more firmware updates to the first subset of the one or more PCI components, wherein the step of logging is performed for each PCI component of the first subset when installation has reached a stage requiring a component reset; and completing installation of each of the one or more firmware updates to the first subset after rebooting the information handling system.

15. The computer program product of claim 9, wherein the non-transitory computer readable medium comprises instructions to perform steps further comprising:

beginning installation of each of the one or more firmware updates to the first subset of the one or more PCI components, wherein the step of logging is performed for each PCI component of the first subset when installation has reached a stage requiring a component reset; and completing installation of each of the one or more firmware updates to the first subset after rebooting the information handling system.

\* \* \* \* \*